United States Patent
Schneider (10) Patent No.: US 6,393,999 B1
(45) Date of Patent: May 28, 2002

(54) IMPACT PROTECTION DEVICE FOR RAIL VEHICLES

(75) Inventor: Sieghard Schneider, München (DE)

(73) Assignee: Siemens Krauss-Maffei Lokomotiven GmbH, Munich (DE)

( * ) Notice: Subject to any disclaimer, the term of this patent is extended or adjusted under 35 U.S.C. 154(b) by 0 days.

(21) Appl. No.: 09/601,060

(22) PCT Filed: Jan. 14, 1999

(86) PCT No.: PCT/EP99/00169

§ 371 Date: Oct. 11, 2000

§ 102(e) Date: Oct. 11, 2000

(87) PCT Pub. No.: WO99/38751

PCT Pub. Date: Aug. 5, 1999

(30) Foreign Application Priority Data

Jan. 28, 1998 (DE) .......................... 198 03 135
Mar. 5, 2000 (DE) .......................... 198 09 489

(51) Int. Cl.⁷ .............................. B61D 15/06
(52) U.S. Cl. ............ 105/392.5; 104/254; 188/371; 188/377
(58) Field of Search ............. 105/392.5; 188/371, 188/376, 377; 293/118, 133; 104/254

(56) References Cited

U.S. PATENT DOCUMENTS 3,508,633 A * 4/1970 Nishimura et al. .......... 188/371
3,599,757 A * 8/1971 Takamatsu et al. .......... 188/371
3,756,643 A * 9/1973 Weed ......................... 293/118
3,968,862 A * 7/1976 Gorges et al. ............... 188/376
4,190,276 A * 2/1980 Hirano et al. ............... 188/376
4,272,114 A * 6/1981 Hirano et al. ............... 293/133
5,293,973 A * 3/1994 Thum ......................... 188/377
5,443,146 A * 8/1995 Ayyildiz et al. ............ 188/371

FOREIGN PATENT DOCUMENTS

| DE | 585 988 | 9/1933 |
| DE | 1 018 447 | 3/1955 |
| DE | 196 16 944 | 10/1997 |
| DE | 196 35 221 | 4/1998 |
| FR | 1 341 396 | 1/1964 |

* cited by examiner

Primary Examiner—S. Joseph Morano
Assistant Examiner—Lars A. Olson
(74) Attorney, Agent, or Firm—Young & Thompson (57) ABSTRACT

The invention relates to an impact protection device for rail vehicles, comprising one or more energy absorbing elements (25) mounted on the main frame of the rail vehicle and having a box-like structure. The invention is characterized in that from the box end in the direction of the main frame (29) a reverse-drawn recess (20) and a buffer rod (21) are provided and the buffer rod can be displaced along the interior wall of the reverse-drawn recess (20). Elastically deformable energy absorbing elements (32) such as a friction spring (33) or a hydraulic capsule (34) are mounted in the hollow space formed by the buffer rod (21) and the reverse-drawn recess (20). The invention provides a greater active length for energy absorption in case of impact than a sequential box arrangement and a standard sleeve buffer.

14 Claims, 9 Drawing Sheets

Compensation of inactive lengths

| Criterion | Related art | Invention |
| --- | --- | --- |
| Length (L) of total unit | 1100 mm | 1100 mm |
| Active length $l_F$ of buffer plunger (spring stroke) | 105 mm | 105 mm |
| Active length $L_D$ of crash element (deformation length) | 360 mm | 620 mm * |
| Percentage of deformation length $L_D$ relative to total length (L) of the total unit | 33% | 56% |
| Total active length ($l_F + L_D$) | 465 mm | 725 mm ** |
| Percentage of total active length relative to total length (L) of the total unit | 42% | 66% |

\* Improvement in comparison with the related art: + 72%
\*\* Improvement in comparison with the related art: + 56%

IMPACT PROTECTION DEVICE FOR RAIL VEHICLES

FIELD OF THE INVENTION

The present invention relates to a crash guard device for a rail vehicle.

BACKGROUND INFORMATION

Figure 1:
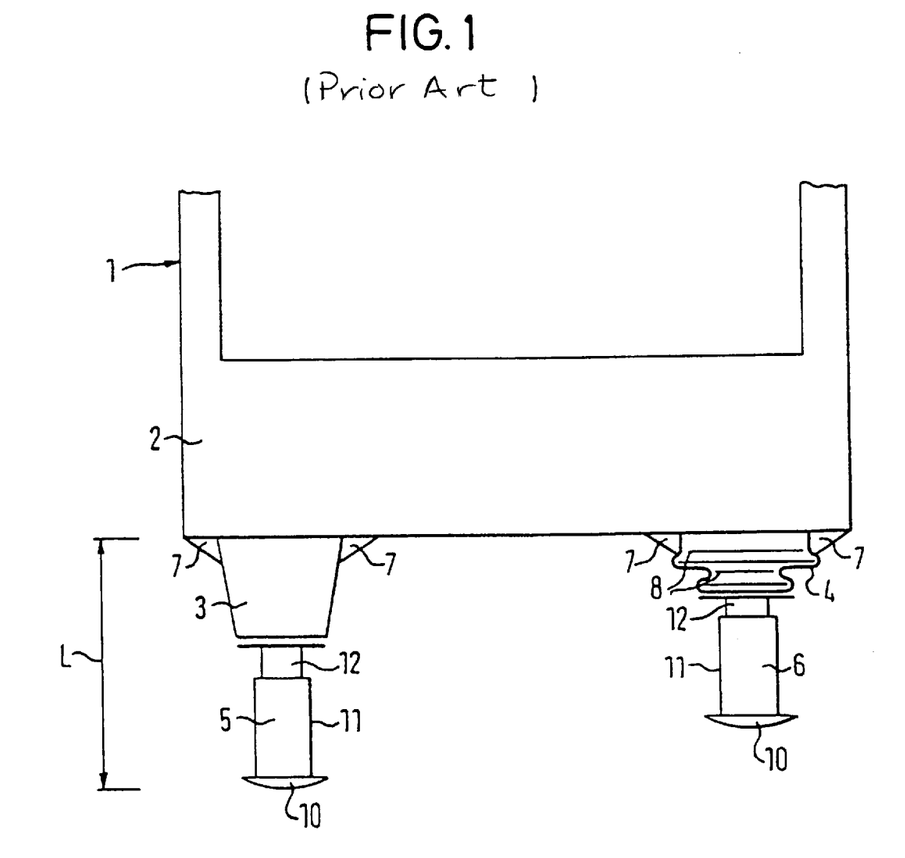
FIG. 1 shows a conventional crash guard device in an uncompressed state (left) and in a compressed state (right).

FIG. 1 of German Patent Application No. 196 35 221.5 shows a conventional crash guard device for rail vehicles.

The device includes energy dissipating elements having a box-shaped structure and a rectangular cross-sectional shape arranged between the main frame of the rail vehicle and the buffer elements. These energy dissipating elements compensate for crash energy that exceeds the energy absorbing power of the buffer elements. German Patent Application No. 196 35 221.5 describes. The embodiment used is characterized in that the cross-sectional shape of the energy dissipating element arranged in each case between the buffer element and the main frame in the form of a closed box-shaped carrier becomes steadily wider in the direction from the buffer element to the main frame. The buffer element is a standard buffer known as a plunger buffer which is known. Such a plunger buffer is composed essentially of a buffer plate 10 mounted on an outside box 11 and inverted over an inside part 12, as shown in FIG. 1 of the patent application cited above. Outside part 11 and inside part 12 can be displaced into one another, and an energy dissipating element, e.g., in the form of a frictional spring, optionally with an additional hydraulic capsule, is arranged inside part 12.

A disadvantage of the conventional known crash guard device is that due to an tandem connection of the conventional energy dissipating element with a standard buffer, based on total length L of the crash guard device, comparatively little active length is available for absorbing energy. Of the total length of the standard buffer element, only a comparatively small distance is available for pushing outside part 11 over element 12 (distance of travel of the buffer element). In addition, it should be recalled that the full length is not available with the energy dissipating element, but instead a residual length always remains in the compressed state.

SUMMARY OF THE INVENTION

According to the present invention a significantly greater active length for absorbing energy is made available with the same total length L.

It should be pointed out here that according to the latest international guidelines for the safety of rail vehicles (ERRI B 205/RP1), a minimum uptake energy of 1 MJ is specified for deformation zones. In addition, according to these guidelines, a deformation path of 1 meter should not be exceeded. However, UIC 566 specifies a minimum strength of 2000 kN for the structure of the rail vehicle. To absorb the required minimum energy of 1 MJ with a force level below 2000 kN, a deformation length of more than 0.5 meter is necessary. Otherwise, the entire structure of the rail vehicle would have to be designed for a higher strength. There are no conventional crash guard devices at the present having a deformation greater than 0.5 meter.

Through an embodiment of a box-shaped energy dissipating element according to the present invention that has an insertion area and a buffer plunger that fits in it and is inserted into it, the energy dissipating element can be designed to be much longer in comparison with conventional devices so that on the whole, a much greater active length is available for dissipating energy. To be able to fully utilize this length, the insertion area must not abut against the main frame when the energy dissipating element crumples, so the main frame is provided with suitable recesses.

Advantageous embodiments of the energy dissipation element have a greater stability with respect to lateral forces and torques and eccentric longitudinal forces, torques which deform only through axial buckling in a crash. This makes use of the finding that when deformation is caused in the box by a crash, the deformation stops first in the area of the end of the box, where the box has a smaller cross section. Since the deformation resistance of the box increases progressively due to the increase in cross section in the direction of the main frame, buckling, which progresses axially from the end of the box to the main frame, stops so that uncontrolled collapse such as that which could occur with a box having a constant cross-sectional shape can be ruled out. In another advantageous embodiment, the box is in the shape of a rectangle, at least in the area of the main frame, with the longer sides being positioned horizontally. The lateral supporting forces of the energy dissipating element can be increased in this way. To further increase the lateral supporting forces, lateral reinforcements may be provided according to the present invention, also causing a progressive increase in resistance to axial collapse. Thus, this mostly prevents the deformation from extending to the following structure (main frame). To further ensure a progressively continuous deformation from the end of the box to the main frame through axial collapse, the structure of the box or the energy dissipating element may be provided with weak points in defined areas according to the present invention e.g., in the form of notches in the wall of the box. These weak points can predetermine where and in which order the walls of the box are deformed due to parallel successive folding. The defined weaknesses in the structure of the box are arranged for example, only in the front area of the box or they decrease toward the rear area in the direction of the main frame. The structural measures described here increase safety, so that the box is deformed only due to axial collapse (compression deformation), which is associated with a high energy dissipation, but uncontrolled buckling (bending deformation) of the box, which causes only a slight energy dissipation can be largely ruled out even with eccentric induction of the crash energy.

Yet another embodiment according to the present invention has the particular advantage that after deformation of the energy dissipating element, only the outer box need be replaced, while the insertion area and the buffer plunger can be reused, optionally as a separate buffer element.

The present invention will now be explained in greater detail below.

DETAILED DESCRIPTION

The present invention is described in greater detail below on the basis of embodiments and with reference to FIGS. 2 through 10. An insertion area and a buffer plunger which is displaceable on the inside wall of the insertion area are provided in each case from the end of the box in the direction of the main frame. Elastically deformable energy absorbing elements, such as a friction spring and/or a hydraulic capsule are built into the hollow space formed by the buffer plunger and the insertion area. Thus, a greater active length is available for energy dissipation in a crash than would be available with a tandem arrangement of a box and a standard box buffer.

Figure 2:
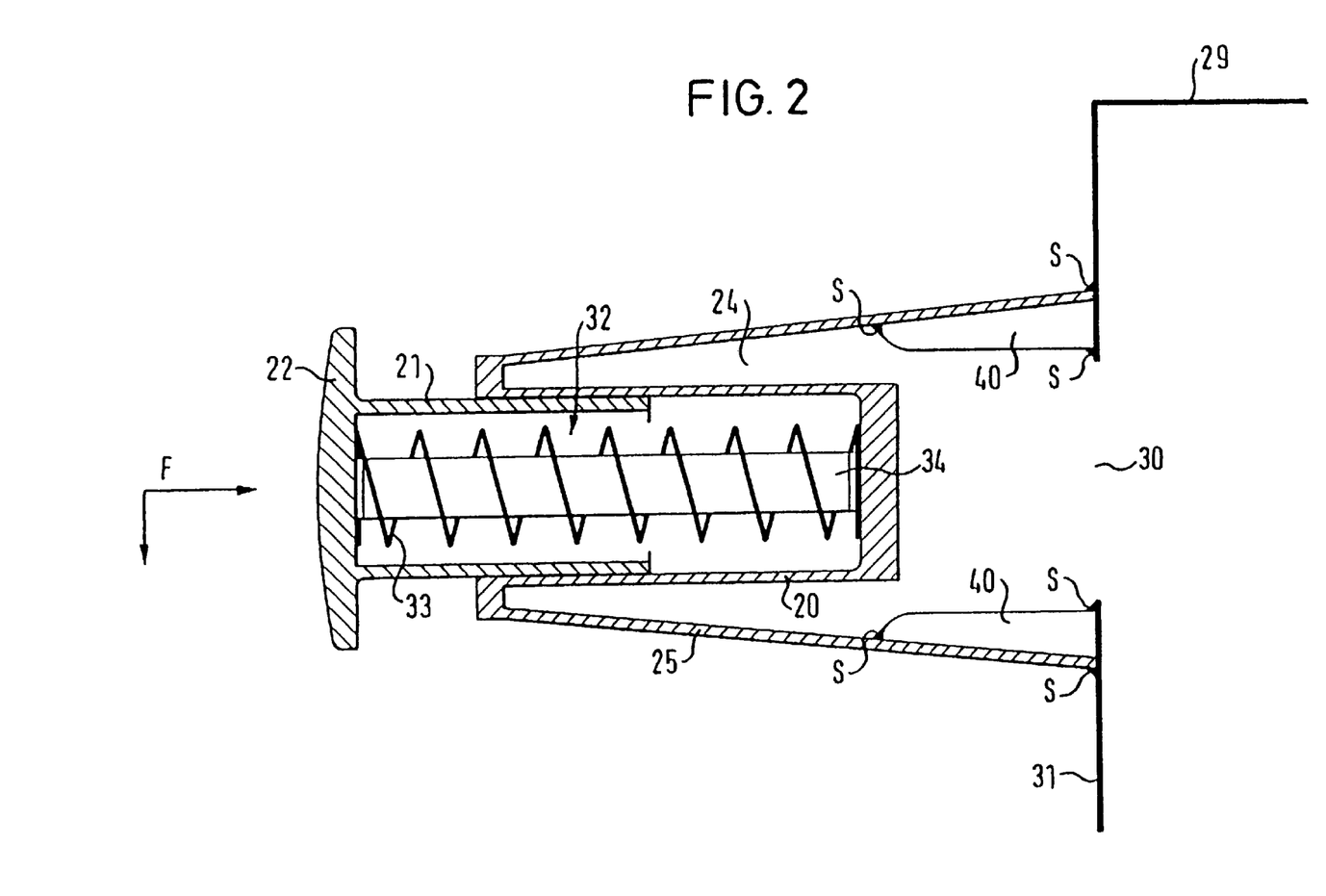
FIG. 2 shows a first embodiment of a crash guard device according to the present invention that has a box-shaped energy dissipating element with an insertion area.

FIG. 2 shows a first embodiment of the crash guard device according to the present invention. It is made up of a box-like energy dissipating element 25, which has an insertion area 20 extending into hollow space 24 and is mounted by welds S on a transverse bar 31 of main frame 29. Insertion area 20 accommodates a buffer plunger 21 that has a buffer plate 22. Inside the hollow space formed by the insertion area and the buffer plunger there is an energy absorbing element 32 having a friction spring or spring collar 33 and a hydraulic capsule 34. The bottom area of insertion area 20 and the end face of the end of the box are designed with reinforcement. Energy dissipating, element 25 is composed of a thick plate and for example has a closed, rectangular cross-sectional shape, with the cross section increasing conically toward the rear to main frame 29 and being mounted on it with the cross-sectional shape of a horizontal rectangle. Guide ribs 40, for example applied to top side 36 and bottom side 37 as well as side walls 35 by welds S, are provided in hollow space 24. In the event of a collision of the rail vehicle with energy in excess of the energy absorbing capacity of energy absorbing element 32, the additional energy is absorbed by deformation of energy dissipating element 25. Recess 30 ensures that the total length of energy dissipating element 25 can be utilized as a deformable structure, because insertion area 20 can enter this recess 30. Guide ribs 40 ensure that insertion area 20 passes through recess 30, in particular with an eccentric collision.

Figure 3:
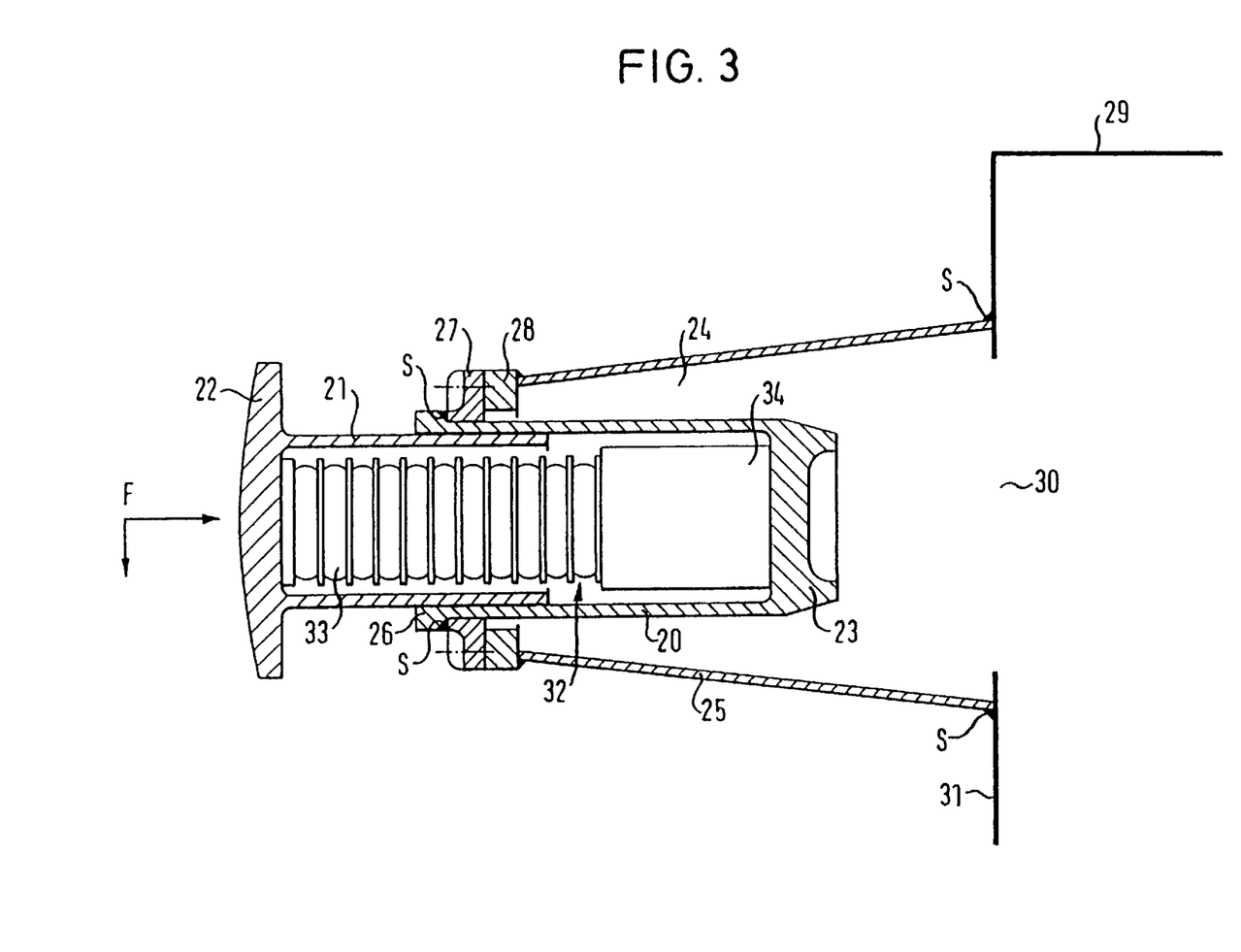
FIG. 3 shows a first embodiment a crash guard device according to the present invention that has a box-shaped energy dissipating element and a separate insertion area.

FIG. 3 shows a second embodiment of a crash guard device according to the present invention having a separately arranged insertion area 20 (buffer box) to accommodate and guide displaceable buffer plunger 21, whose end is designed as a plate 22 or is provided with a separate buffer plate. Bottom part 23 of the buffer box may be designed as a plate bottom, for example, depending on requirements, so it is reinforced and optimized in terms of weight. If necessary, the plate bottom may be chamfered on the outside. Insertion area 20 that has buffer plunger 21 is inserted into hollow space 24 of energy dissipating element 25 that has a box-shaped structure and for example a rectangular cross section. To utilize the total length L of the crash guard device as optimally as possible and to make available as much active length as possible, energy dissipating element 25 has a length such that its ends and is attached at the plate end of buffer box 20. Weld joints and/or detachable connections, e.g., screw connections, may be used to attach buffer box 20 to energy dissipating element 25. In the embodiment shown in FIG. 3, the plate end of buffer box 20 is designed as a reinforced part 26 which has a greater wall thickness than buffer box 20. A flange 27 is placed over buffer box 20 and mounted on reinforced end piece 26 by a peripheral weld seam. Head piece 28 of deformable energy dissipating element 25 has a recess through which the entire buffer element can be inserted into hollow space 24 of the energy dissipating element until flange 27 is in contact with the outer surfaces of head piece 28. The buffer element then can be screwed onto the energy dissipating element. The entire crash guard device is attached by welds S to main frame 29 or its head part of the rail vehicle. Energy dissipating element 25 has a thick plate and a box-shaped structure with a for example closed, rectangular cross-sectional shape. The advantageous embodiment of this energy dissipating element is described in German Patent Application No. 196 35 221.5, i.e., the cross section of this energy dissipating element increases conically to the rear toward main frame 29 and is mounted on it with the cross-sectional shape of a horizontal rectangle. The mount may be in the form of weld seam S; likewise, the connection may be designed to be detachable. Energy dissipating element 25 may be provided with connecting plates at the connection points to main frame 29. In the conically enlarged area, lateral reinforcements in the form of supporting ribs may also be provided. In the event of a collision of the rail vehicle with an energy exceeding the energy absorbing capacity of the buffer element (20, 21 and 22), the additional energy is absorbed by the deformation of energy dissipating element 25 as a deformable structure. To be able to utilize the total length of energy dissipating element 25, a recess 30 is provided in transverse bar 31 so that the buffer element can pass through it. The structural design of energy dissipating element 25 according to the advantageous embodiment largely ensures that it will not collapse (bending deformation) even with eccentric induction of the impact energy but instead will deform by buckling axially. This deformation caused by compression causes a parallel folding of the walls of energy dissipating element 25 in the manner of a bellows shock absorber.

With the embodiments illustrated in FIGS. 2 and 3 and explained above, almost all of total length L over which the crash guard device extends can be utilized as active length. Thus on the whole, one and the same structure absorbs operating forces while at the same time containing the deformable structure for absorbing energy. Due to the greater available deformation distance, there is a lower force induction into the rail vehicle at the same energy dissipation. Thus, the locomotive structure can have a lighter design and likewise, all the built-in parts can be designed for lower shock loads. This yields total overall weight savings. As an alternative to the embodiment described above, energy dissipating element 25 may also be designed in the form of an insertion tube.

Figure 4:
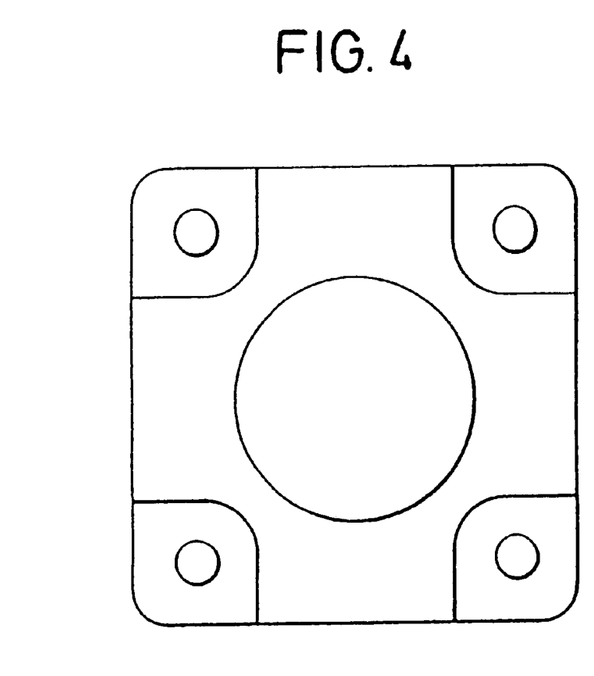
FIG. 4 shows a first embodiment of a flange for mounting an insertion tube on an energy dissipating element according to the present invention.
Figure 5:
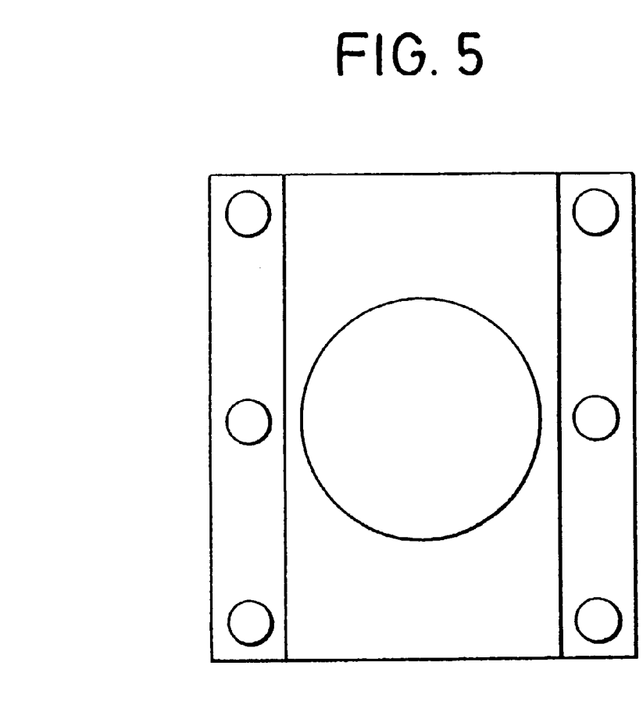
FIG. 5 shows a second embodiment of a flange for mounting an insertion tube on an energy dissipating element according to the present invention.

FIGS. 4 and 5 show two variants of flange 27 as seen from above. The flange is reinforced and optimized in terms of weight. The dimensions ultimately depend on the outside diameter of buffer box 20.

Figure 6:
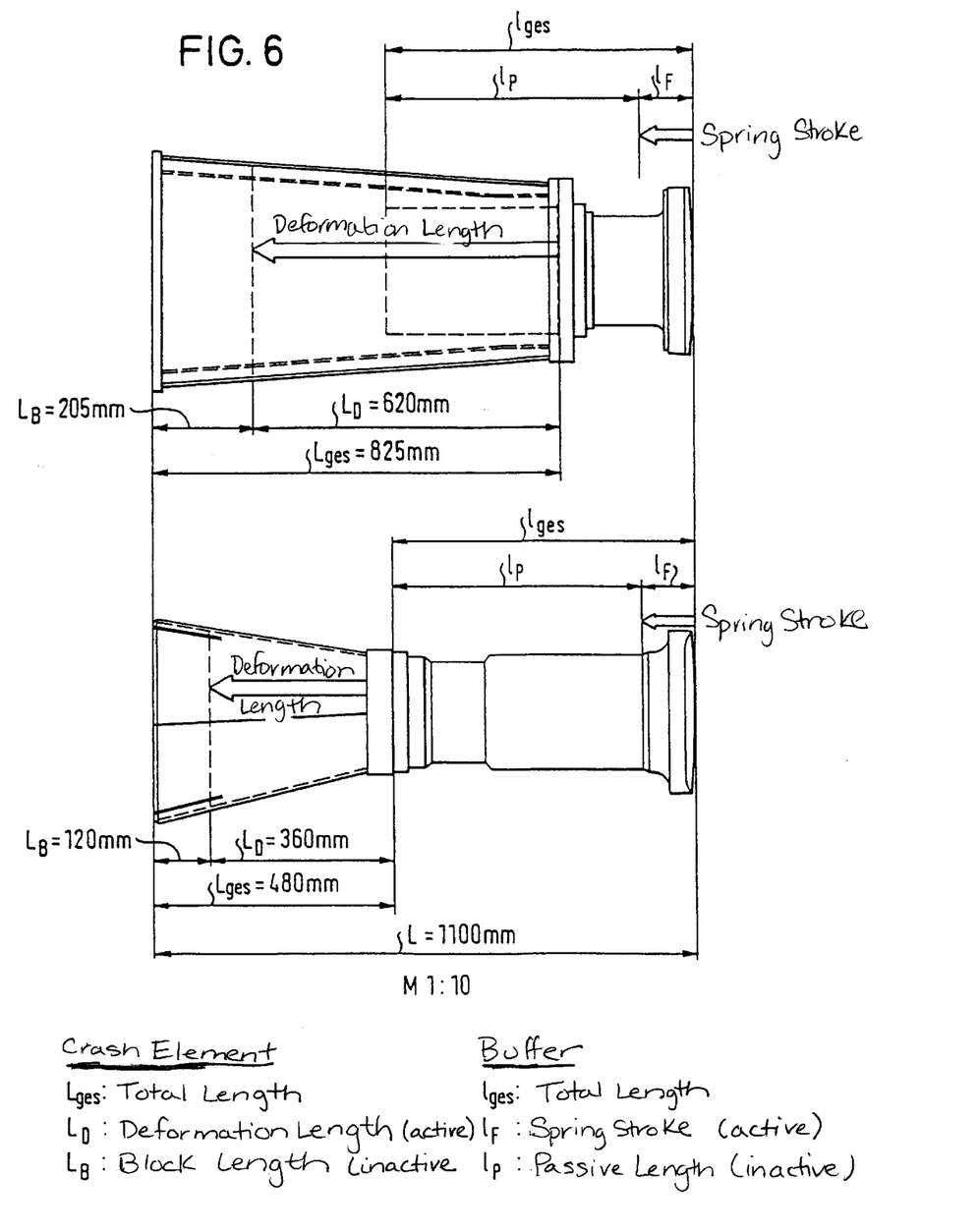
FIG. 6 shows a true-to-scale comparative diagram of active and inactive lengths of a conventional device (bottom diagram) to a device according the present invention (top diagram).
Figure 7:
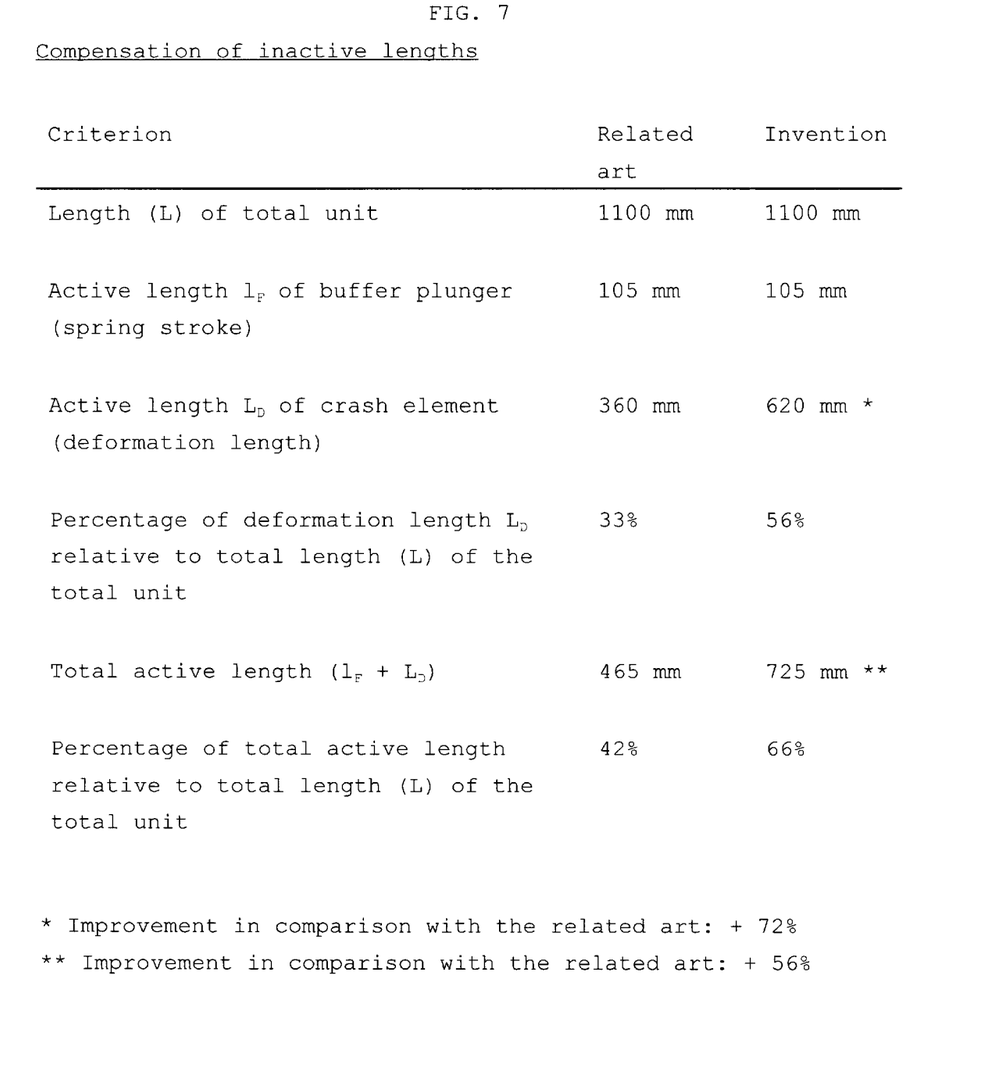
FIG. 7 shows a table comparing important dimensions of conventional crash guard devices to a crash device according to the present invention.

FIG. 6 shows a true-to-scale (1:10) diagram comparing a conventional crash guard device (bottom) to a crash guard device according to an embodiment of the present invention (top) to permit a direct comparison of the active and inactive lengths. The most important dimensions of the two crash guard devices are also listed in the table in FIG. 7. The percentage of the active length (deformation length) of crash element 25 has been increased by 72% in comparison with conventional devices. With regard to the total active length of the crash guard device (deformation length plus spring stroke) this yields a 56% improvement in comparison with conventional devices.

Figure 8:
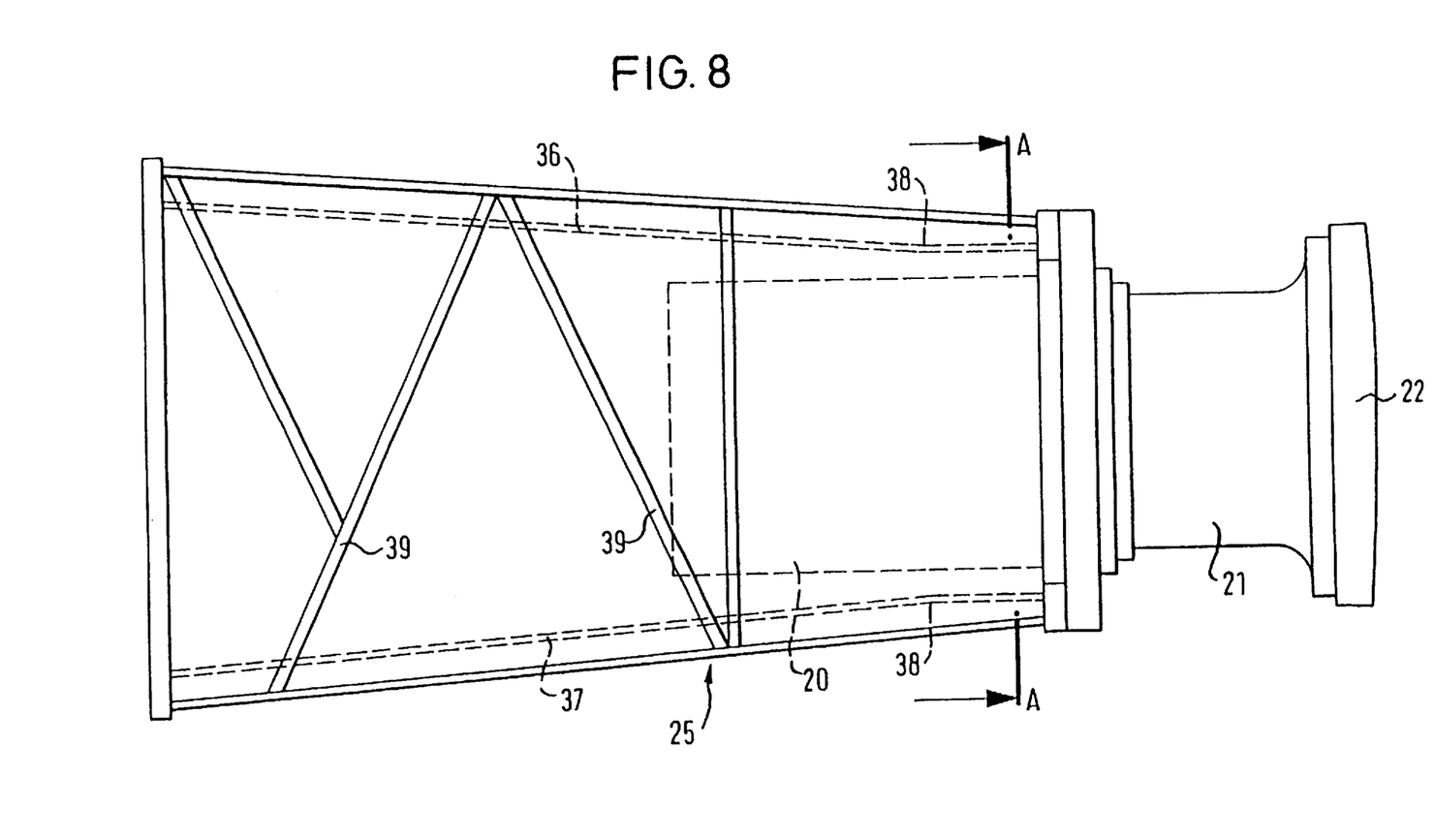
FIG. 8 shows a side view of a crash guard device that has an advantageous design of a crash element.

The crash guard device illustrated in FIG. 8 shows an advantageous embodiment of energy dissipating element (crash element) 25. Slight kinks 38 (weak point) are provided in top side 36 and bottom side 37 in the end area of energy dissipating element 25 facing the buffer plate. First, this reduces the peak force at which deformation of energy dissipating element 25 occurs, so that in the event of a collision of the rail vehicle with an energy exceeding the energy absorbing capacity of energy absorbing element 32, the rail vehicle is exposed to a lower maximum force induction. Second, this determines the location of the first fold, so that axial collapse is initiated at this location. The folding resistance is increased with additional lateral ribbing 39, and an advantageous force-distance curve is predetermined.

Figure 9:
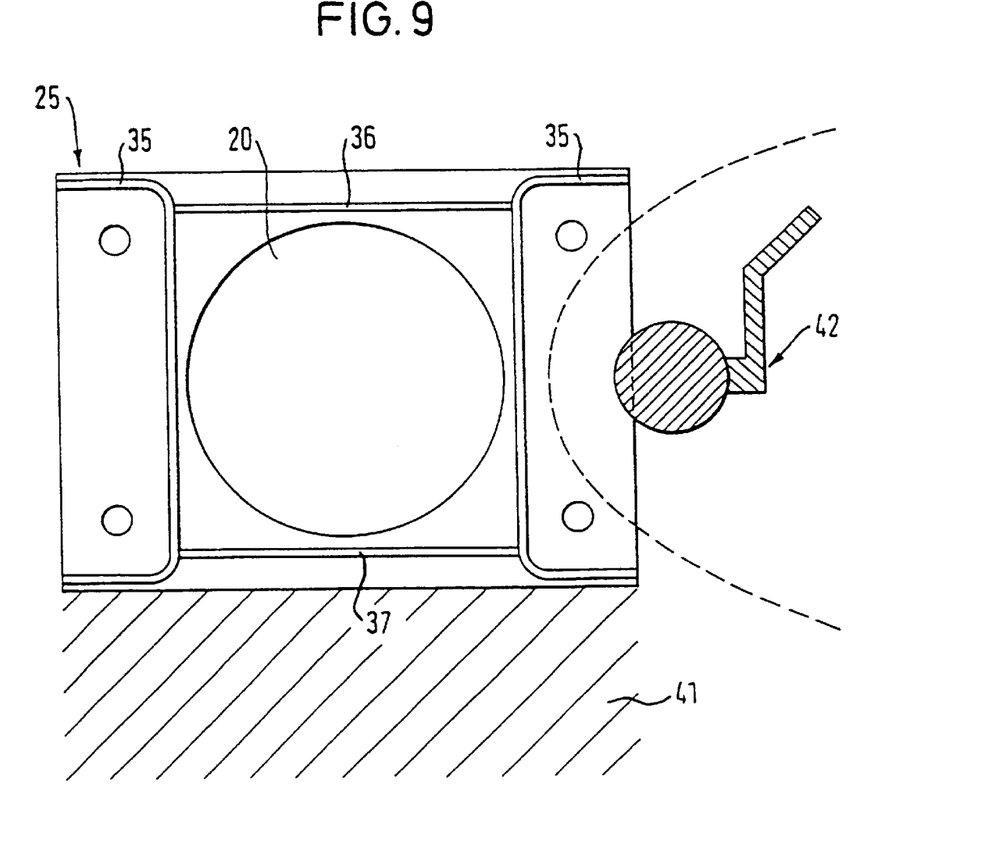
FIG. 9 shows a cross sectional view in a front area of the crash element along line A—A shown in FIG. 8.

FIG. 9 shows the cross section of the crash guard device from FIG. 8 along line A—A. Energy dissipating element 25 is designed with U-shaped side walls 35 so that the specified clearances can be maintained. Thus, for example, there is enough clearance (dotted line) for the arrangement of a compressed air tap 42 and its operation. In addition, due to the advantageous box-shaped design of energy dissipating element 25 with a rectangular cross section, which increases conically toward the rear in the direction of the main frame, it is ensured that the required free passage 41 beneath the buffer as specified according to the Eisenbahnbetriebsordnung [Railway Operating Regulations] (EBO) can be maintained in the area of the buffer.

Figure 10:
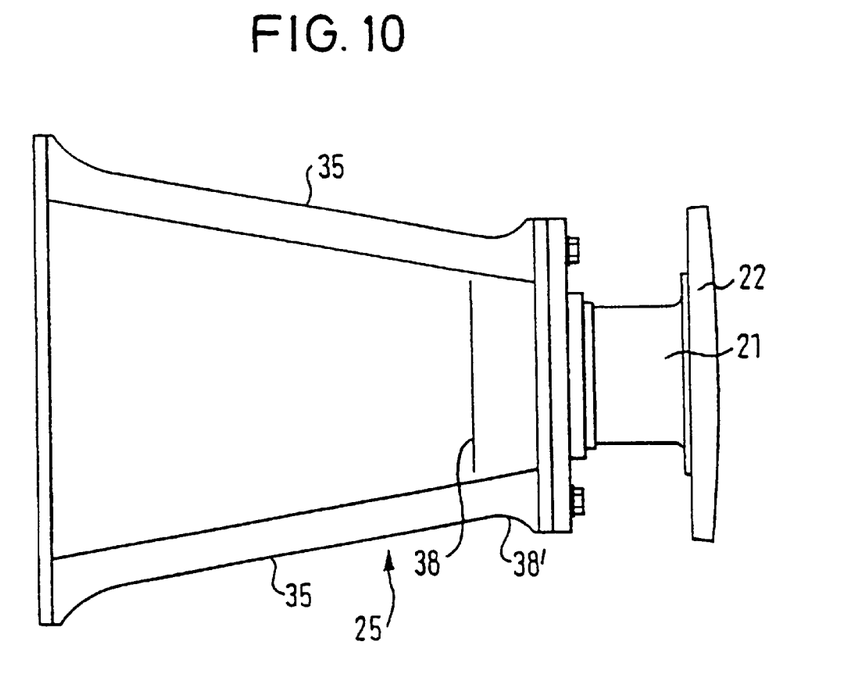
FIG. 10 shows a top view of a crash element having a buffer plunger according to the present invention.

FIG. 10 shows a top view of the crash guard device according to the present invention. Energy dissipating element 25 has the advantageous box-shaped design with a rectangular cross section, which is enlarged conically in the direction of the main frame and has U-shaped side walls 35. Defined weak points 38, 38' are provided on top side 36, bottom side 37 and side walls 35 to induce axial collapse. Not shown are the parts of the buffer located in the interior of energy dissipating element 25. Only the part of buffer plunger 21 and buffer plate 22 projecting out of the insertion area or buffer box 20 is shown here.

List of Reference Numbers 1 main frame
2 transverse bar
3 energy dissipating element (crash element) in the uncompressed state
4 energy dissipating element (crash element) in the compressed state
5, 6 buffer elements composed of
10 buffer plate
11 buffer box
12 inside part of buffer
7 lateral supporting ribs
20 insertion area or buffer box
21 buffer plunger
22 buffer plate
23 bottom part of the buffer box
24 hollow space in the energy dissipating element
25 energy dissipating element (crash element)
26 reinforced end piece of the buffer box
27 flange
28 head piece of the energy dissipating element
29 main frame or head piece
30 recess in transverse bar 31
31 transverse bar
32 energy dissipating element of the buffer
33 friction spring or spring collar
34 hydraulic capsule
35 U-shaped side wall of the crash element
36 top side of the crash element
37 bottom side of the crash element
38 38' defined weak points
39 ribs to increase resistance to folding
40 guide ribs for the passage of the insertion area through the recess in the transverse bar
41 clearance beneath the buffer (specified by the Railway Operating Regulations)
42 compressed air tap with operating handle

What is claimed is:

1. A crash guard device for a rail vehicle, comprising:
an energy dissipating element mounted on a main frame of the rail vehicle, the energy dissipating element being boxed-shaped and enlarging steadily in the direction of the main frame; and
a buffer including a buffer plunger having an integrally molded buffer plate, a buffer box and an elastic energy absorbing element arranged between the buffer plunger and the buffer box, the buffer plunger configured to dip in the buffer box, the buffer box being an insertion area of the energy dissipating element and located entirely forward of the main frame, a recess being provided on the main frame for passage of the buffer box so that the buffer box remains outside of the recess until the energy dissipating element collapses toward the main frame and the buffer box passes into the recess.

2. The crash guard device according to claim 1, wherein:
the energy dissipating element has a quadrilateral cross-sectional shape.

3. The crash guard device according to claim 2, wherein:
the energy dissipating element has a rectangular cross section at least in an area of the mounting on the main frame, the longer sides of the rectangular cross section being positioned horizontally.

4. The crash guard device according to claim 1, further comprising:
lateral reinforcements at least in an area of the mounting on the main frame, the lateral reinforcements arranged to guide the buffer box into the recess upon the energy dissipating element collapsing.

5. The crash guard device according to claim 4, wherein:
the lateral reinforcements extend over an entire length of the energy dissipating element; and
the lateral reinforcements and side walls of the energy dissipating element form a U-shaped cross section.

6. The crash guard device according to claim 4, wherein:

the lateral reinforcements and side walls of the energy dissipating element are each formed in one piece, one of the lateral reinforcements and the side walls being attached to a top part and the other of the lateral reinforcements and the side walls being attached to a bottom part to form a box-shaped structure.

7. The crash guard device according to claim 6, wherein:

the lateral reinforcements and the side walls are attached by welding.

8. The crash guard device according to claim 1, wherein:

the energy dissipating element includes weak points to produce parallel folds extending from an end of the energy dissipating element to the main frame in the event of a collision.

9. The crash guard device according to claim 1, wherein:

the energy dissipating element and the buffer box are separate parts, an inverted part of the buffer box being detachably mounted on an end of the energy dissipating element.

10. The crash guard device according to claim 9, wherein:

the inverted part is detachably mounted using screw connections.

11. The crash guard device according to claim 9, further comprising:

a flange welded around the buffer box in the area of an end of the energy dissipating element, the flange being provided for mounting the buffer box, the flange being detachably mounted on the end of the dissipating element.

12. The crash guard device according to claim 9, wherein:

the buffer box and the buffer plunger are buffer elements.

13. The crash guard device according to claim 1, wherein:

the buffer box has a cylindrical cross section.

14. The crash guard device according to claim 4, wherein the lateral reinforcements are in the form of tapered guide ribs.

* * * * *